United States Patent
Slapak et al.

(10) Patent No.: US 9,423,497 B2
(45) Date of Patent: Aug. 23, 2016

(54) OBSTACLE MAP RECONSTRUCTION SYSTEM AND METHOD

(71) Applicant: Radar obstacle detection Ltd., Hod HaSharon (IL)

(72) Inventors: Alon Slapak, Mazor (IL); Nirom Cohen-Nov Slapak, Mazor (IL)

(73) Assignee: RADAR OBSTACLE DETECTION LTD., Hod Hasharon (IL)

( * ) Notice: Subject to any disclaimer, the term of this patent is extended or adjusted under 35 U.S.C. 154(b) by 342 days.

(21) Appl. No.: 14/182,284

(22) Filed: Feb. 17, 2014

(65) Prior Publication Data

US 2015/0355323 A1    Dec. 10, 2015

(51) Int. Cl.
*G01S 13/42* (2006.01)
*G01S 13/56* (2006.01)
*G01S 7/41* (2006.01)
*G01S 7/02* (2006.01)
*G01S 13/94* (2006.01)

(52) U.S. Cl.
CPC ............... *G01S 13/56* (2013.01); *G01S 7/024* (2013.01); *G01S 7/414* (2013.01); *G01S 13/42* (2013.01); *G01S 13/94* (2013.01)

(58) Field of Classification Search
CPC ......... G01S 13/56; G01S 7/024; G01S 13/94; G01S 13/42; G01S 7/414; G01S 13/726; G01S 7/412; G01S 13/723
USPC ............................................ 342/146, 90, 195
See application file for complete search history.

(56) References Cited

U.S. PATENT DOCUMENTS

| | | | |
|---|---|---|---|
| 4,902,126 A | 2/1990 | Koechner | |
| 5,574,426 A | 11/1996 | Shisgal et al. | |
| 7,236,121 B2 * | 6/2007 | Caber | G01S 13/726 244/3.15 |
| 7,567,203 B2 * | 7/2009 | Dizaji | G01S 7/412 342/37 |
| 7,692,573 B1 * | 4/2010 | Funk | G01S 7/003 342/90 |
| 7,705,780 B1 * | 4/2010 | Khoury | G01S 7/021 342/377 |
| 8,836,573 B2 * | 9/2014 | Yanagihara | G01S 7/412 342/179 |
| 8,912,946 B2 * | 12/2014 | Yanagihara | G01S 13/874 342/22 |
| 2006/0279453 A1 * | 12/2006 | Caber | G01S 13/726 342/97 |
| 2007/0024494 A1 * | 2/2007 | Dizaji | G01S 7/412 342/90 |
| 2009/0319560 A1 * | 12/2009 | Cheng | G06F 17/30781 |
| 2010/0085241 A1 | 4/2010 | Meyers et al. | |
| 2011/0298652 A1 * | 12/2011 | Yanagihara | G01S 13/874 342/146 |
| 2011/0304498 A1 * | 12/2011 | Yanagihara | G01S 7/412 342/70 |
| 2015/0123836 A1 * | 5/2015 | Niv | H01Q 1/28 342/27 |
| 2015/0355323 A1 * | 12/2015 | Slapak | G01S 13/56 342/146 |

FOREIGN PATENT DOCUMENTS

IL    WO 2013164811 A1 * 11/2013 ............... H01Q 1/28

* cited by examiner

*Primary Examiner* — John B Sotomayor
(74) *Attorney, Agent, or Firm* — Reches Patents

(57) ABSTRACT

A method for obstacle detection, the method may include receiving or generating, by a computerized system, detection information about input radio frequency (RF) signals detected by a RF receiver as a result of a transmission of RF output signals towards a space that comprises potential obstacles; and detecting, by the computerized system, obstacles by associating agent behaviors with clusters of input RF signals.

25 Claims, 18 Drawing Sheets

OBSTACLE MAP RECONSTRUCTION SYSTEM AND METHOD

FIELD OF THE INVENTION

The present invention relates to systems for detection of obstacles and more particularly to methods for obstacle map reconstruction (OMR) which interprets data from obstacle detection system, in order to create an obstacles map or alert.

BACKGROUND

Obstacle detection system (also known in the literature as sense and avoid, obstacle avoidance system (OASYS), obstacle collision avoidance and obstacle warning to name only a few), is used for any type of vehicles and applies to obstacles which are related to the said vehicle type and environment. For example, obstacle detection system for ground vehicles (manned and unmanned) may apply to obstacles such as (but not only) other vehicles, people, signposts, trees, fence, railing and pylons. Obstacle detection system for aerial vehicles (manned and unmanned) may apply to obstacles such as (but not only) other vehicles, suspended wires, point obstacles, pylons, antennas, trees, buildings and terrain features.

Commonly, obstacle detection system consists of four (or less) major parts:

a. Sensor: This is used to detect obstacles, either actively or passively, and may be, for example, a camera, acoustic sensor, laser radar (LADAR), radio-frequency (RF) radar, and more.

b. Signal processor: This may be either analog or digital, and is aiming at extracting, for each obstacle, a set of quantitative numbers describing each obstacle. For example, three (or less) coordinates fully (or partially) describing the position of the obstacle, velocity of the obstacles relatively to the system, reflection coefficient describing the structure of the obstacle, sensitivity to polarization describing the characteristic of the obstacle (e.g., wire or pylon), and more.

c. Obstacle map reconstruction (OMR): a method to interpret the data received from the signal processor, and to create an obstacles map or alert.

d. Path planning: This part (also known as automatic or autonomous maneuver device or system for example) is used to plan, represent and/or take principal driving directions within an environment while avoiding obstacles.

Heretofore, various systems were devised to detect suspended wires, which form an obstacle for helicopters and for low flying light aircraft. Various wires include high voltage power cables, medium voltage cables, telephone cables and more.

Helicopters may collide with these wires, with fatal consequences. The problem is that it is difficult to see wires from the air, on the dark background of the ground. This is difficult at daytime in a good weather. It is impossible to see wires at night or in bad weather.

Suspended wires are more dangerous to helicopters than other ground obstacles. Ground obstacles usually have a relatively small width and height, whereas wires are located higher and span a large width, so the danger of collision with wires is much higher. Therefore, it is important to distinguish suspended wires from other ground reflectors and to warn the pilot accordingly.

US patent application 20110264303 of Lenser et al. illustrates a prior art method for improving situational awareness for teleoperation of a remote vehicle.

Prior art sensor systems apparently do not detect wires effectively. These include, for example, millimeter wave radar, laser radar, FLIR and more. These prior art systems are complex, heavy and costly and only achieve a limited success in detecting wires. There is a need for a light weight, simple structure system for wire detection and pilot warning.

SUMMARY

According to an embodiment of the invention there may be provided a method for obstacle detection, the method may include receiving or generating, by a computerized system, detection information about input radio frequency (RF) signals detected by a RF receiver as a result of a transmission of RF output signals towards a space that may include potential obstacles; and detecting, by the computerized system, obstacles by associating agent behaviors with clusters of input RF signals.

The method may include clustering the input RF signals to provide the clusters of input signals; wherein a cluster of input RF signals may include input RF signals reflected or scattered during a period of time from a potential obstacle.

The input RF signals are detected by an airborne RF receiver that moves in relation to potential obstacles; wherein the method may include referring to the airborne RF receive as virtually static and referring to potential obstacles as virtually moving in relation to the airborne RF receiver.

The method may include detecting a plurality of obstacles by associating a multiple agent behavior to the plurality of obstacles.

The associating of the multiple agent behavior to the plurality of obstacles may include compensating for a lack of input RF signals from at least one of the plurality of obstacles during at least one point of time.

An agent behavior associated with a cluster of RF signals may be selected out of multiple agent behaviors of a plan library.

The detection information may include attributes selected out of distance, grazing angle, bearing angle, polarization and closure speed.

The method may include classifying obstacles.

The method may include resolving obstacle goals.

The obstacles may include wires and pylons.

The method may include associating current values of attributes of the detection information that are related to an obstacle as a state of the obstacle.

The system may be represented by an executer agent and the method may include responding to the detecting of the obstacles by following a plan library of the executer agent.

According to an embodiment of the invention there may be provided a system that may include a memory for storing detection information about input radio frequency (RF) signals detected by an airborne RF receiver as a result of a transmission of RF output signals towards a space that may include potential obstacles; and an obstacle detector for detecting obstacles by associating agent behaviors with clusters of input RF signals.

The system may be arranged to cluster the input RF signals to provide the clusters of input signals; wherein a cluster of input RF signals may include input RF signals reflected or scattered during a period of time from a potential obstacle.

The input RF signals are detected by an airborne RF receiver that moves in relation to potential obstacles; wherein the system may be arranged to refer to the airborne RF receive as virtually static and referring to potential obstacles as virtually moving in relation to the airborne RF receiver.

The system may be arranged to detect a plurality of obstacles by associating a multiple agent behavior to the plurality of obstacles.

The associating of the multiple agent behavior to the plurality of obstacles may include compensating for a lack of input RF signals from at least one of the plurality of obstacles during at least one point of time.

The agent behavior associated with a cluster of RF signals may be selected out of multiple agent behaviors of a plan library.

The detection information may include attributes selected out of distance, grazing angle, bearing angle, polarization and closure speed.

The system may be arranged to classify obstacles.

The system may be arranged to resolve obstacle goals.

The obstacles may include wires and pylons.

The system may be arranged to associate current values of attributes of the detection information that are related to an obstacle as a state of the obstacle.

The system may be represented by an executer agent and the system may be arranged to respond to the detecting of the obstacles by following a plan library of the executer agent.

According to an embodiment of the invention there may be provided a non-transitory computer readable medium that stores instructions that once executed by a computer cause the computer to receive or generate detection information about input radio frequency (RF) signals detected by an airborne RF receiver as a result of a transmission of RF output signals towards a space that may include potential obstacles; and detect obstacles by associating agent behaviors with clusters of input RF signals.

The non-transitory computer readable medium may store instructions for clustering the input RF signals to provide the clusters of input signals; wherein a cluster of input RF signals may include input RF signals reflected or scattered during a period of time from a potential obstacle.

The input RF signals are detected by an airborne RF receiver that moves in relation to potential obstacles; wherein the non-transitory computer readable medium may store instructions for referring to the airborne RF receive as virtually static and referring to potential obstacles as virtually moving in relation to the airborne RF receiver.

The non-transitory computer readable medium may store instructions for detecting a plurality of obstacles by associating a multiple agent behavior to the plurality of obstacles.

The associating of the multiple agent behavior to the plurality of obstacles may include compensating for a lack of input RF signals from at least one of the plurality of obstacles during at least one point of time.

The method wherein an agent behavior associated with a cluster of RF signals may be selected out of multiple agent behaviors of a plan library.

The detection information may include attributes selected out of distance, grazing angle, bearing angle, polarization and closure speed.

The non-transitory computer readable medium may store instructions for classifying obstacles.

The non-transitory computer readable medium may store instructions for resolving obstacle goals.

The obstacles may include wires and pylons.

The non-transitory computer readable medium may store instructions for associating current values of attributes of the detection information that are related to an obstacle as a state of the obstacle.

The system may be represented by an executer agent and the non-transitory computer readable medium may store instructions for responding to the detecting of the obstacles by following a plan library of the executer agent.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
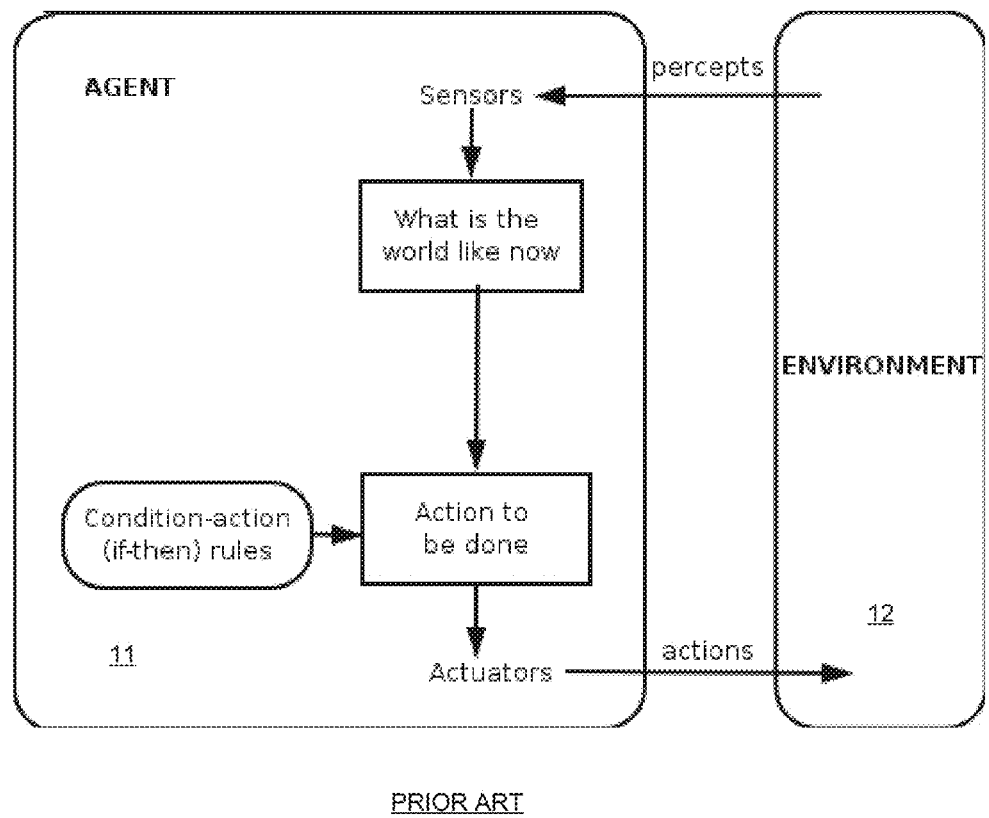
FIG. 1 illustrates a prior art agent and its environment.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

An aspect of some embodiments of the invention is concerned with reconstruction of obstacles map (also known as environment or world map), based on data from the signal processor of the obstacle avoidance system. Such data is, for example, a set of quantitative numbers describing each obstacle, and the vehicle on which the system is installed. For example, three (or less) coordinates fully (or partially) describing the position of the obstacle and vehicle, velocity of the obstacles relatively to the vehicle, reflection coefficient describing the structure of the obstacle, sensitivity to polarization describing the characteristic of the obstacle (e.g., wire or pylon), and more.

Prior art obstacle map reconstruction (OMR) methods often suffer from relatively poor accuracy and/or insufficient reliability. Truly effective OMR requires that temporary unobserved obstacles be accounted for (e.g., pylon which is hidden by a hill for time period along the vehicle trajectory). Moreover, effective OMR requires reliable deduction of obstacles which reflects no direct information to the sensor, e.g., wires that cannot be detected by camera sensor due to negligible one dimension, or existence of noise and clutters. Unfortunately, this feature has not been fully perfected with current methodologies. Therefore, a need exists for a system and method to overcome these situations.

In an embodiment of the invention, the system refers to obstacles as to multi agent system (MAS), and performs OMR based on MAS principles and methods illustrated, for example, in the following references all being incorporated herein by reference: (a) U.S. Pat. No. 7,146,348, (b) US patent applications 20070150427 and 20070226164 of Gieb et al., (c) H. A. Kautz and J. F. Allen, "Generalized plan recognition", in Proc. Of the 5$^{th}$ National Conf. on Art. Int. (AAAI-86), pp 32-37, AAAI press, 1986, (d) S. Caberry, Plan recognition in natural language dialogue, MIT press, Cambridge, Mass., 1990, and (e) E. Charniak and R. P. Goldman, "A Bayesian model of plan recognition", Art. Int., 64(1), pp. 53-79, 1993.

Although the system executing the OMR is moving while the obstacles are static, in order to apply MAS methods to detect the obstacles the system is regarded as being virtually static while the static obstacles are regarded as virtually moving.

This point of view enables ascribing agent behavior to obstacles; thereby enable using MAS methods for effective OMR. The following table lists the terminology conversion between OMR terminology and MAS terminology:

| | OMR | MAS |
|---|---|---|
| 1. | Obstacles map | multi agent system (MAS) |
| 2. | Obstacle | Agent |
| 3. | Input from obstacle detection system's signal processor, and from other information sources, e.g., from GPS, Gyro and data from other OMR systems | World model |
| 4. | All possible positions/motions of the obstacle relatively to the system. | Plan library |
| 5. | Current obstacle position | State |
| 6. | Predicted trajectory relatively to the system | Intention recognition |

World model is a set of quantitative variables describing the environment at which the system acts.

Agent is an autonomous object with objectives. The agent receives input from the environment (sense), reconstructs world model and takes some actions in order to accomplish its objectives. One cycle of on agent it termed "sense-think-act". FIG. 1 illustrates agent 11 and its environment 12.

Executer agent is the system.

Observed agent is an extrinsic agent which is observed by the executer agent.

Behavior is an action of agent. The action may be intrinsic or extrinsic to the agent. Behavior comprises a set of pre-conditioned, a set of end-conditions, a set of monitoring conditions, a 1$^{st}$ status flag which can be "Active" or "Inactive", and a 2$^{nd}$ status flag which can be "Failed" or "Successful". Behavior may be composed of several behaviors.

Figure 2:
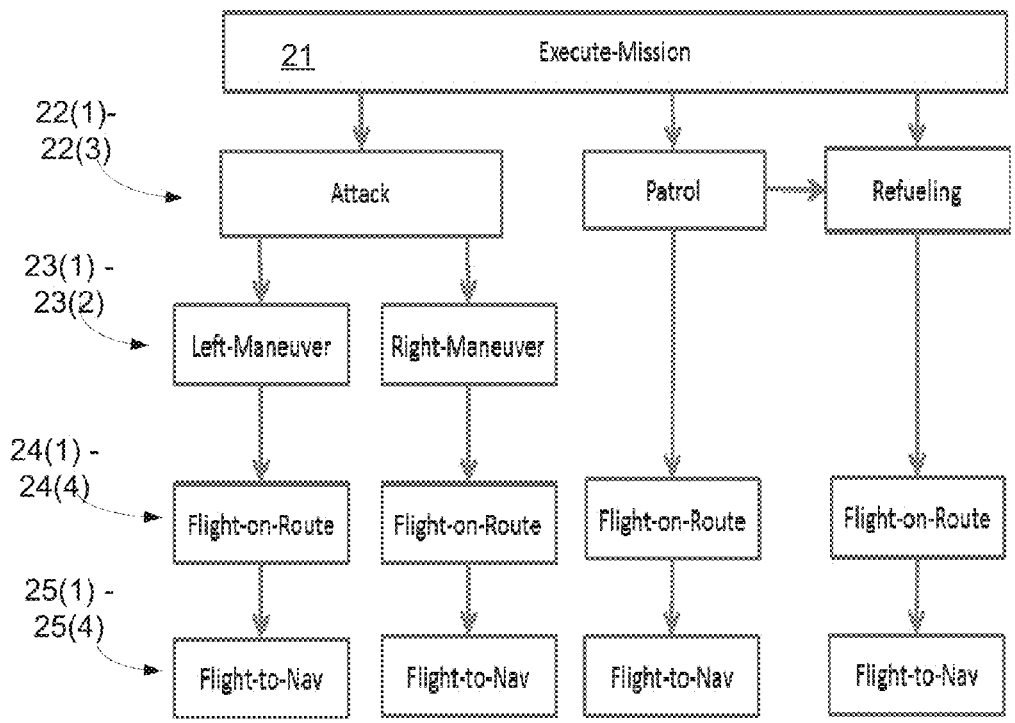
FIG. 2 illustrates a plan library according to an embodiment of the invention.
Figure 3:
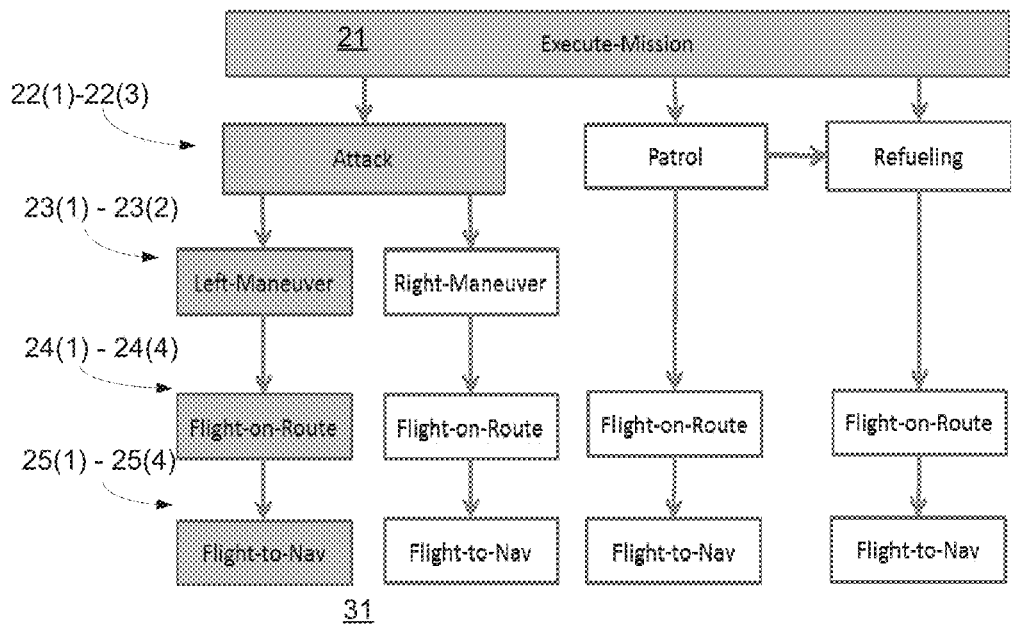
FIG. 3 illustrates a plan library according to an embodiment of the invention.
Figure 3:
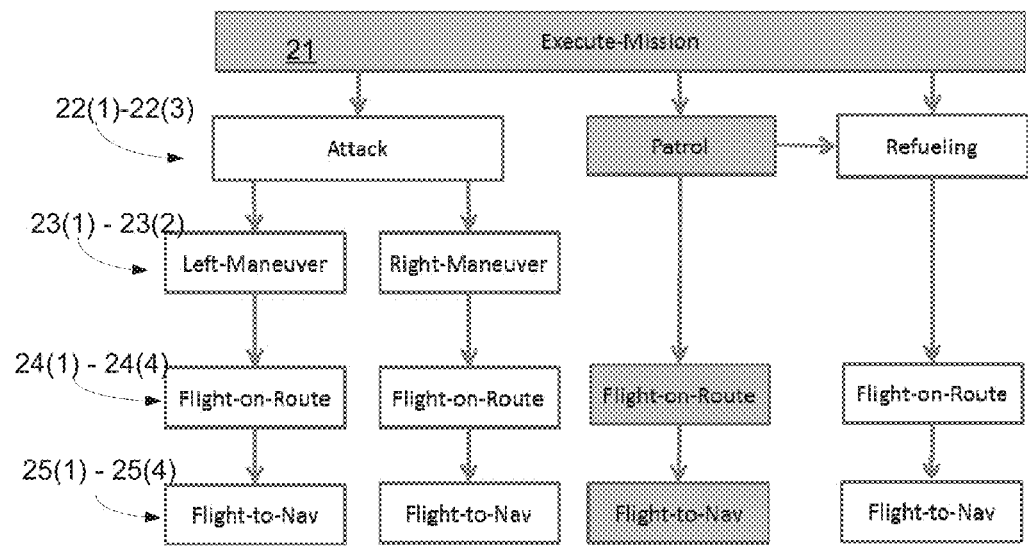

Graph of behaviors (also known as plan library) is a directed acyclic connected graph data-structure, in which the nodes are the agent's behaviors and edges can be of two types: (1) vertical edges indicating inclusion: a node is composed of its sons; (2) horizontal edges indicating temporal order. For example, plan library 20 of FIG. 2 includes first level node "Execute-Mission" 21, second level nodes 22(1)-22(3) "Attack", "patrol" and "refueling", third level nodes 23(1)-23(2) "Left-Maneuver" and "Right-Maneuver", fourth level nodes 24(1)-24(4) and fifth level nodes 25(1)-25(4). Various nodes are behaviors. "Patrol" 22(2) is temporally prior (horizontal edge) to "Refueling" 22(3) in time.

Intention is a path in the graph, composed of nodes connected by vertical edges, from the root to one of the leaves of the graph. For example, in Error! Reference source not found., graph 31 includes shaded grey edges 21, 22(1), 23(1), 24(1) and 25(1) while graph 32 includes shaded grey edges 21, 22(2), 24(2) and 25(2)—showing two different intensions.

In general graph 20 of behaviors has 4 possible intentions.

Active intention is an intention for which all its behaviors are marked "Active".

Hypothesis is an intention with a probability. For example, often, the observed agent is inaccessible, and its true intention is unknown. In this case, its graph of behaviors may include several active intentions (i.e. several paths from the root to one of the leaves), each with a probability such that the sum of the probabilities is 1.

Agent's state is a data structure incorporating the knowledge of an agent about the world. Knowledge comprises: graph of behaviors; list of hypotheses; input data from sensors; outputs data emitted by the agent, or mathematical functions on the input data, on the output data or on both.

Recipe is a dynamic mechanism to maintain the status flag of the behaviors in the graph of behaviors. Based on the agent's state, the recipe marks the relevant intentions as "Active" or "Inactive", based on the following algorithm:
 a. Input: Agent's state
 b. Set the $1^{st}$ status of the root is "Active"
 c. For each behavior which is not the root: If pre-conditions are met, and the $1^{st}$ status of the parent of the behavior is "Active" then if there is a temporally prior behavior that was "Active", or there is not such a temporally prior behavior but all temporally subsequent behaviors are "Inactive", then set the $1^{st}$ status "Active" If end-conditions are met, or the $1^{st}$ status of the parent of the behavior is "Inactive" then set the $1^{st}$ status "Inactive"
 d. Output: Agent's state Monitoring is a dynamic mechanism inspecting whether a behavior, marked as "Active", is indeed performed. For example: behavior "go ahead" of a robot is active, but due to mechanical failure the robot does not move. Namely, the behavior is not performed. Monitoring uses the following algorithm:
 a. Input: Agent's state
 b. Set the $2^{nd}$ status of the root is "Successful"
 c. For each behavior which is not the root: If the $1^{st}$ status of behavior is "Active" and the monitoring-conditions are met, then set $2^{nd}$ status flag "Successful". Else, set $2^{nd}$ status flag "Failed".
 d. Output: Agent's state Intention recognition is a dynamic mechanism, identifying the set of all agent's hypotheses using the following algorithm:
 a. Input: Agent's state
 b. For each Hypothesis: If all behaviors are "Active" and "Successful" add the hypothesis to the list of hypotheses.
 c. Output: Agent's state Mirroring is an architecture, in which the intention recognition of an observed agent is performed as part of the executed agent. Mirroring originates from neuroscience, where research works have shown that the same neurons react for an action made by either the monkey (executed agent) of another monkey (observed agent). Rizolatti (G. Rizolatti, "The mirror neuron system and its function in humans", Anatomy and Embryology, 210(5-6), pp. 419-421, 2005) termed these neurons "mirror neurons", and argued that they are responsible for simultaneous and continuous identification of other people.

Figure 4:
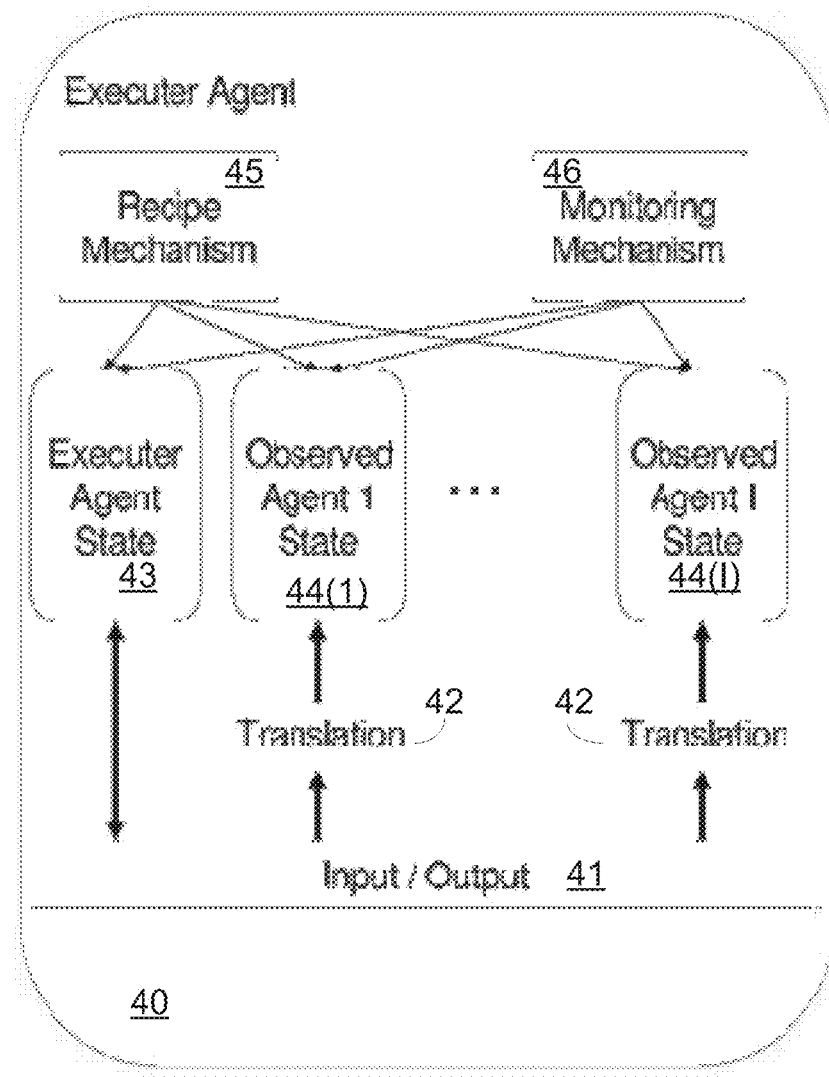
FIG. 4 illustrates mirroring according to an embodiment of the invention.

Error! Reference source not found. FIG. 4 describes the mirroring. The executer agent 40 maintains one state for itself (43), and one state for each of the observed agents 44(1)-44(I) for I monitored obstacles. It should be noted all the agents' states are of the same type. Every agent's state receives input data 41 from the sensors, where the observed agents' states receive the data after translation 42. The translation 42 is required because the sensors are part of the executer agent, which is often at a different position than the observed agent. The translation compensates for this difference. For the simplicity of exposition, we assume an identity translation also for the executer agent's state. The recipe and the monitoring (boxes 45 and 46) run on each of the agents' states to update the $1^{st}$ and the 2nd status.

Mirroring Algorithm:
 a. Input: Executer and observed agent's state
 b. Do forever
 c. For each agent's stat
   Get translated input data from sensors
   Run recipe
   Run Monitoring
   Run Intention recognition
 d. Output: Executer and observed agent's state Example for monitoring: Consider a group of aircraft (e.g., 4 helicopters) flying in an obstructed environment, at least one of them is equipped with the said OMR system. Each OMR system is referred as executer, and maintains states for itself (Executer agent's state) and for each of the other aircraft (Observed agents' states). The state in this case might be, for example, the obstacles map in an area in front of the each aircraft and the position and the action of each aircraft (elevating, turning, etc.). In other word, the system maintains the obstacles map from its point of view and its maneuver (43), and the obstacles map and the maneuver for each of the other aircraft (44(1)-44(I).

The input/output (41) are, for example, from optical and/or RF sensors which observe the position of the obstacles and the positions of the other aircraft.

The translation (42) is, for example, geometrical transformation which employs vector algebra to calculate the position of each obstacle relatively to each aircraft by (vector) subtraction of the position of each aircraft relatively to the executer from the position of each obstacle relatively to the executor. In other words, the translated input data is the calculated position of each obstacle relatively to the aircraft (observed agent) for which the input data was translated.

The recipe (45), in this example, maintains the estimated obstacle map for each aircraft (which might differ from aircraft to aircraft as some obstacle might be hidden from different locations), and the optional maneuvers for each aircraft. The Monitoring mechanism (46) inspects, for example, the true maneuver, and the intention recognition infers the direction to which each aircraft will proceed, and the obstacles map for each aircraft might be corrected accordingly. For example, an abrupt turn of one of the aircraft might imply an obstacle which is not detected by the executer.

The inference on the other agents' states might improve the accuracy and the reliability of the obstacle map, as well as supporting its tactical flight as a group.

Temporal monitoring selectivity is a method to reduce the number of intention recognition executions in order to reduce computational load, while maintain the same recognition quality (N. Cohen-Nov Slapak, "An integrated multi-agent intention recognition systems", Master thesis, Bar-Ilan University, 2008.)

Teamwork is a cooperation of a group of agents, sharing common objectives and an agreement to achieve these objectives. The group maintains another graph of behaviors—group behavior graph—reflecting the common objectives, synchronization between agents' actions and covering up mechanism within the group.

For example, referring to the mirroring example, the group of aircraft might be communicating via a communication channel, and sharing each other states, thereby improving the counterparts' obstacle maps and maneuver.

Effective obstacle detection system should account for obstacles that are unobserved occasionally, and to circumvent partial and/or inaccurate data (e.g., position) about the obstacles that is produced by the radar signal processor. Unfortunately, this feature has not been fully perfected with current methodologies. Therefore, a need exists for a system and method of probabilistically detecting obstacles based upon partial data.

According to one aspect of the invention, the obstacles detection takes obstacles as agents, and systems of obstacles (e.g., electricity system comprises pylons and wired) as a group of agents having a noticeable teamwork. This enables the system: one, to cluster several indications from the radar signal processor into noticeable obstacle; and two, to infer obstacle position and characteristic by identifying the teamwork of the other obstacles in the system.

According to another aspect of the invention, the obstacle detection uses monitoring combined with mirroring architecture to share data between a group of systems, thereby improve the inferred obstacle map.

In a preferred embodiment, the system receives from the radar signal processor vectors of parameters; each of them describes an indication of an obstacle. For example, such a vector may be $(\rho, \theta, \Phi, \Psi, v)$, Where:
$\rho$ (rho)—The distance of the point from the system.
$\theta$ (theta)—The angle of the point relative to the horizontal flight plane $\{0, 2\pi\}$
$\Phi$ (phi)—The angular distance of the point relative to the line of flight (LOF) $\{-\pi/2, \pi/2\}$
$\Psi$ (psi)—The polarization of the point relative to the horizontal flight plane $\{[0, \pi], -1\}$.
For example, $\Psi$ (wire)=0, $\Psi$ (pole)=$\pi/2$, $\Psi$ (building)=−1
v (vi)—The closure speed to point.

Also, in a preferred embodiment, the system receives data from telemetric sensors such as GPS and/or Gyro, such that (Lat, Lon, Ely) are the global coordinates of the system, and (R (roll), P (pitch), AZ (azimuth)) are the spherical angles of the system.

According to a second aspect of the invention, in order to provide the obstacle map reconstruction (OMR), the system translates the positions of the obstacles from relative axes to global axes. The system will transfer the obstacles map to the display and/or warning system either in relative or global axes. Also, the system may save the obstacles map in any memory media for future use, such as, flight in a later time, communication with other systems, mapping, and more. For example, once the system reconstructs an obstacles map while going from A to B, in the way from B to A the system might use the map that was already prepared and saved in the memory, and only validates, corrects, augments or improves the existing map. Moreover, any other system going from A to B may receive the obstacles map by any means of communication, and use it, validate, correct, augment or improve it. To this end, a task will work in the background to save data to any memory media, e.g., Flash memory.

Various embodiments of the invention will now be described by way of examples.

Single Obstacle

While usually the system will be used in a moving vehicle, such as aircraft, one aspect of the invention is to refer to the system as fixed at a point, and the movement is referred to the obstacles. When the system identifies noticeable intention, it defines it as an obstacle.

In a first example the system propagates directly towards a single pylon. The single pylon can be detected by finding (in a noiseless-ideal scenario) a decrement of rho while $\ominus$=0 and $\phi$=0.

Figure 5:
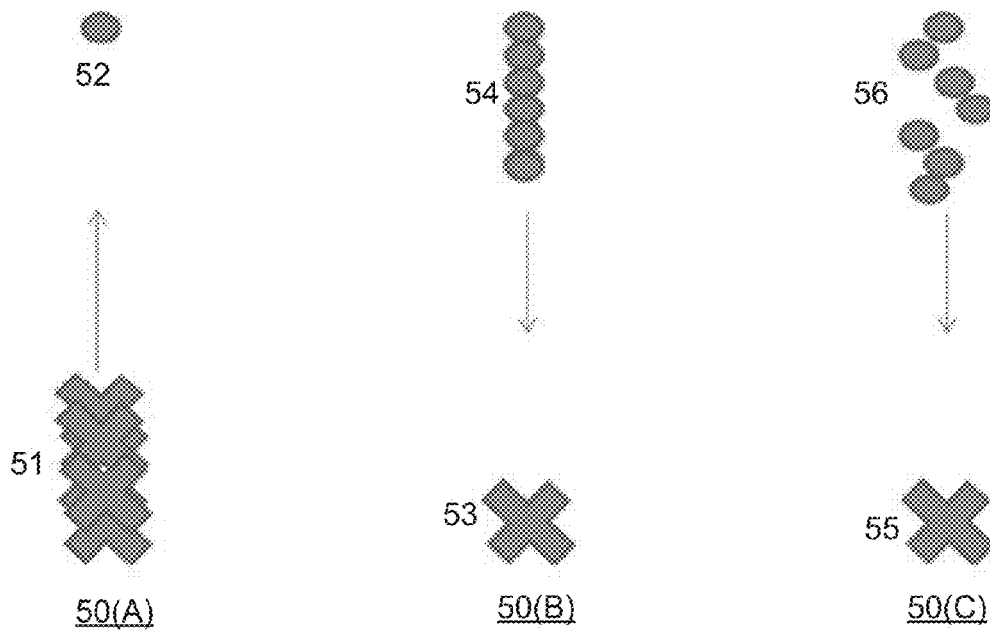
FIG. 5 illustrates a system approaching a pylon according to an embodiment of the invention.

FIG. 5 includes three parts 50(A), 50(B) and 50(C). Part 50(A) illustrates a system (represented by a sequence of 'X' 51 representing the locations of the system at different points in time) approaching a pylon (denoted 'O' 52). In this case, the vectors from the radar signal processor describing the pylons introduce decreasing rho and $\ominus$=0, $\phi$=0 constantly. Part 50(B) illustrates a system point of view (no noise, ideal scenario), in which the system is virtually static (X 53) while the obstacle is virtually moving (represented by a sequence of 'O' 52) in which rho decreases, $\ominus$=0 and, $\phi$=0. Part 50(C) illustrates a noisy scenario in which rho decreases (not necessarily monotonic), while $-\alpha \leq \theta \leq \alpha$ for some constant $_\alpha$.

In a second example the system propagates towards a single pylon that is located at the right side of the propagation path of the system. The single pylon can be detected by finding (in a noiseless-ideal scenario) a decrement of rho while $\ominus$ increases and $\phi$=0.

Figure 6:
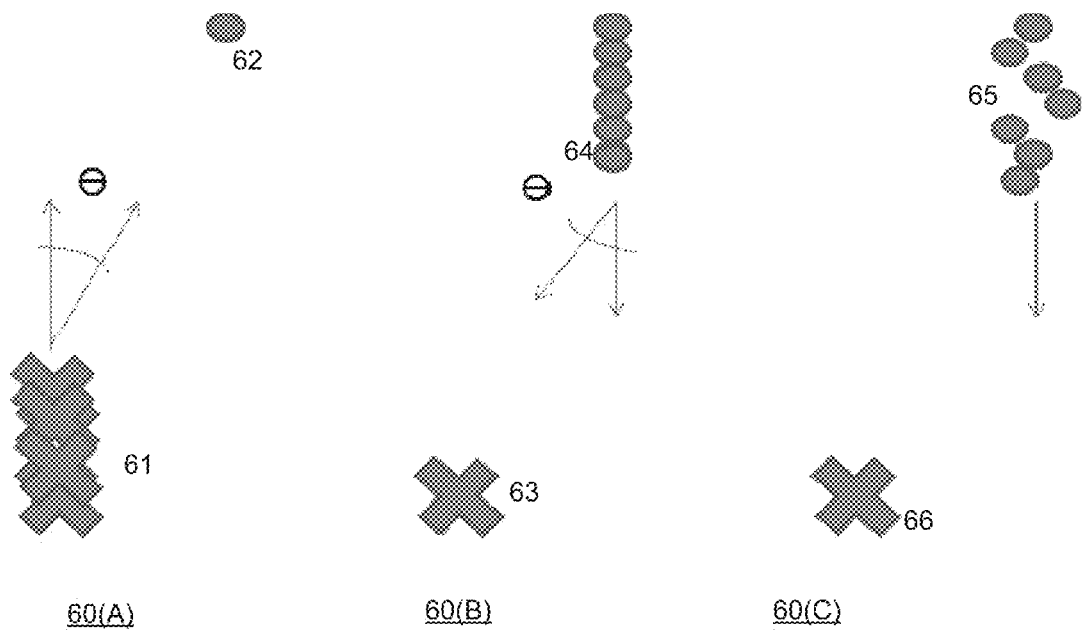
FIG. 6 illustrates a system approaching a pylon according to an embodiment of the invention.

FIG. 6 includes three parts 60(A), 60(B) and 60(C). Part 60(A) illustrates a system (represented by a sequence of 'X' 61 representing the locations of the system at different points in time) approaching a pylon (denoted 'O' 62). In this case, the vectors from the radar signal processor describing the pylons introduce decreasing rho increasing $\ominus$ and $\phi$=0. Part 60(B) illustrates a system point of view (no noise, ideal scenario), in which the system is virtually static (X 63) while the obstacle is virtually moving (represented by a sequence of 'O' 62) in which rho decreases, a decrement of rho while $\ominus$ increases and $\phi$=0. Part 60(C) illustrates a noisy scenario in which rho decreases (not necessarily monotonic), while $\theta_0 - \alpha \leq \theta \leq \theta_0 + \alpha$ for some constant $_\alpha$ and $\theta_0$ is the value of an ideal sensor.

Figure 7:
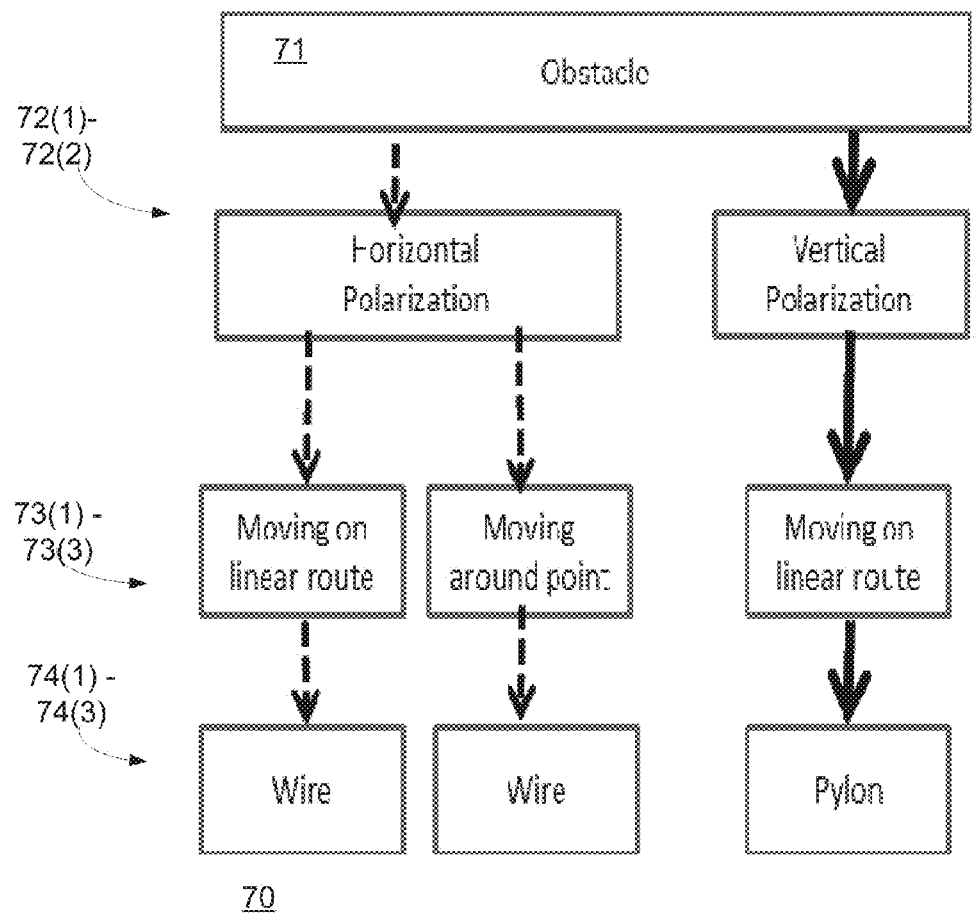
FIG. 7 illustrates a plan library according to an embodiment of the invention.

Error! Reference source not found. FIG. 7 describes the plan library of a system and an intention (denoted by the bold arrows) inferred by the system for the two scenarios described in FIGS. 5 and 6, The first behavior tested by the sensor is the polarization which is identified as vertical, the second behavior is the direction of the obstacle which is on a linear route in both cases. The behavior of the obstacle, as is reflected in the vectors received from the radar signal processor, leads to an identification of the obstacle as pylon, and leads to an accurate position of the obstacle.

Wire: Scenario 1: wire perpendicular to LOF, rho decreases, $\ominus$=0, $\phi$=0

In a third example the system propagates directly towards a single wire. The single wire can be detected by finding (in a noiseless-ideal scenario) a decrement of rho while $\ominus$=0 and $\phi$=0.

Figure 8:
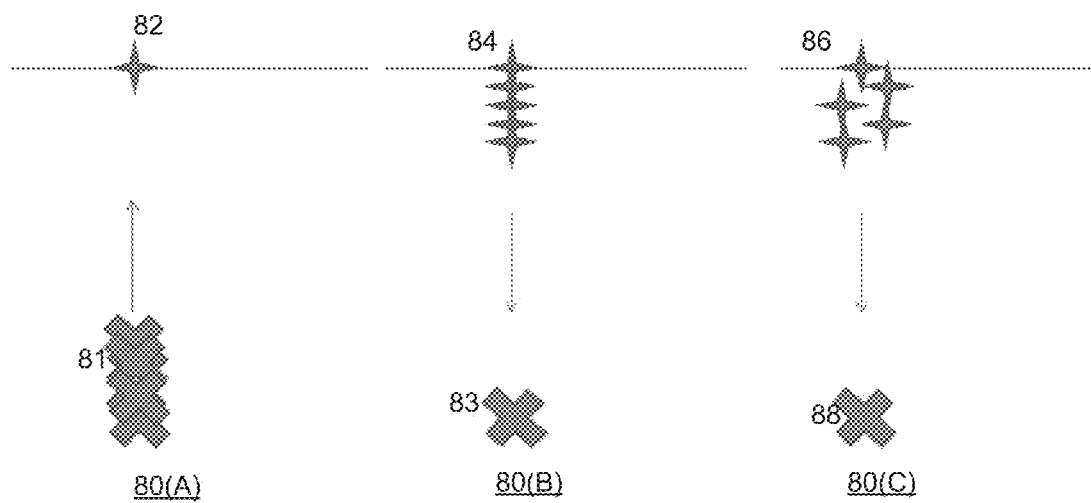
FIG. 8 illustrates a system approaching a pylon according to an embodiment of the invention.

FIG. 8 includes three parts 80(A), 80(B) and 80(C). Part 80(A) illustrates a system (represented by a sequence of 'X' 81 representing the locations of the system at different points in time) approaching a wire (a point of impingement of the RF signals on the wire is denoted '+' 82). In this case, the vectors from the radar signal processor describing the wires introduce decreasing rho and $\ominus$=, $\phi$=0 constantly. Part 80(B) illustrates a system point of view (no noise, ideal scenario), in which the system is virtually static (X 83) while the obstacle is virtually moving (represented by a sequence of '+' 82) in which rho decreases, $\ominus$=0 and, $\phi$=0. Part 80(C) illustrates a noisy scenario in which rho decreases (not necessarily monotonic), while $-\alpha \leq \theta \leq \alpha$ for some constant $_\alpha$.

Figure 9:
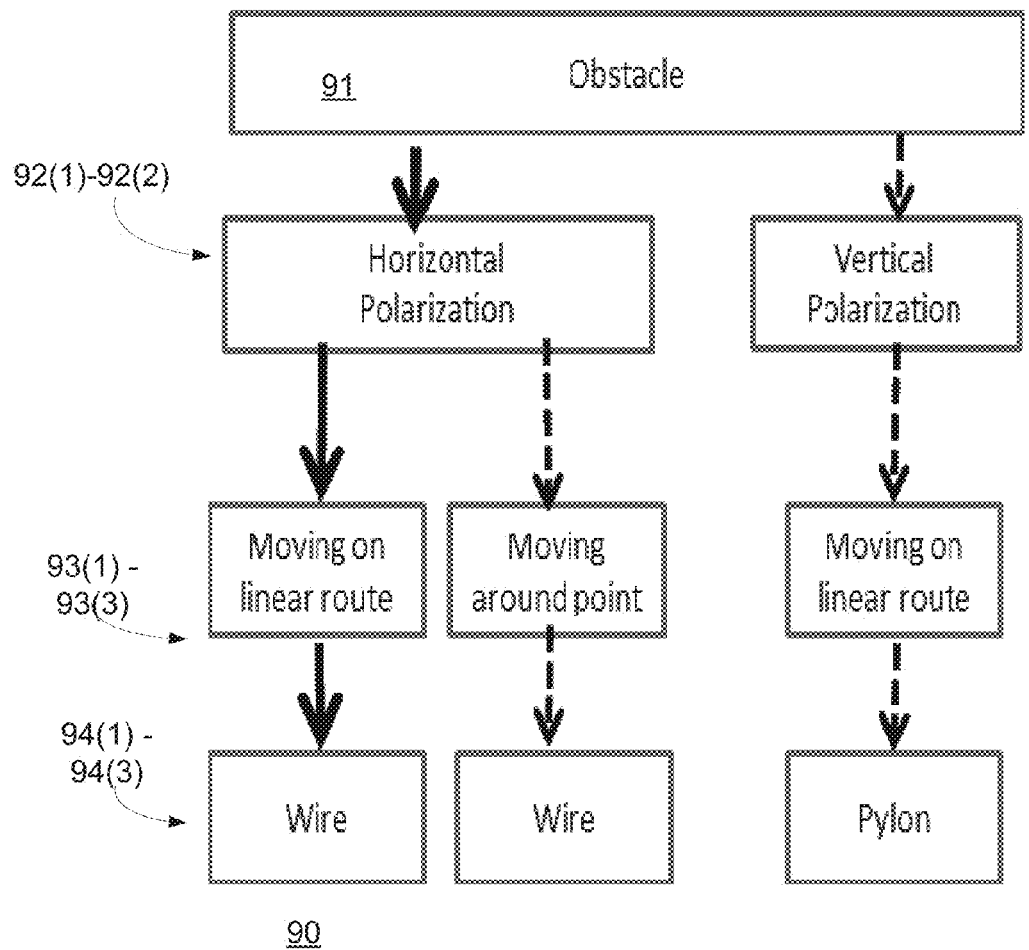
FIG. 9 illustrates a plan library according to an embodiment of the invention.

Error! Reference source not found. FIG. 9 describes the plan library of a system and an intention (denoted by the bold arrows) inferred by the system for the scenario described in FIG. 8 Error! Reference source not found. The first behavior tested by the sensor is the polarization which is identified as horizontal, the second behavior is the direction of the obstacle which is on a linear route. The behavior of the obstacle, as is reflected in the vectors received from the radar signal processor, leads, therefore, to an identification of the obstacle as wire, and leads to an accurate position and orientation of the obstacle.

In a fourth example the system propagates in parallel to a single wire. The single wire can be detected by finding (in a noiseless-ideal scenario) a constant rho while $$\theta = \frac{\pi}{2}, \varphi = 0.$$

Figure 10:
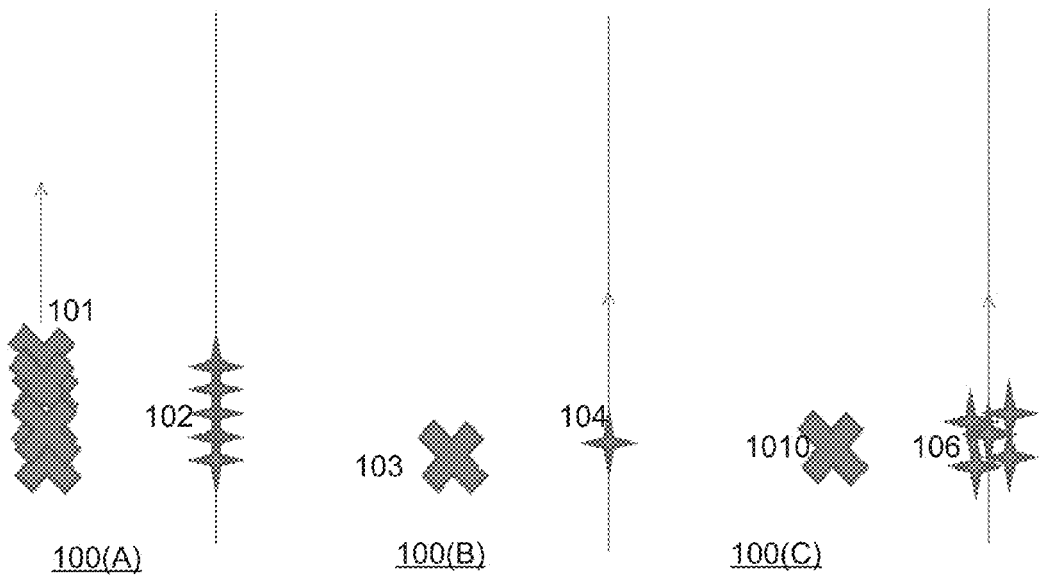
FIG. 10 illustrates a system approaching a pylon according to an embodiment of the invention.

FIG. 10 includes three parts 100(A), 100(B) and 100(C). Part 100(A) illustrates a system (represented by a sequence of 'X' 101 representing the locations of the system at different points in time) approaching a wire (a point of impingement of the RF signals on the wire is denoted '+' 102). In this case, the vectors from the radar signal processor describing the wires introduce a constant rho and $$\theta = \frac{\pi}{2}, \varphi = 0$$

constantly. Part 100(B) illustrates a system point of view (no noise, ideal scenario), in which the system is virtually static (X 103) while the obstacle is also virtually static (represented by a '+' 102) in which rho is constant, $$\theta = \frac{\pi}{2} \text{ and, } \varphi = 0.$$

Part 100(C) illustrates a noisy scenario in which rho slightly changes (moving around a point), while $$\frac{\pi}{2} - \alpha \le \theta \le \frac{\pi}{2} + \alpha$$

for some constant $\alpha$.

Figure 11:
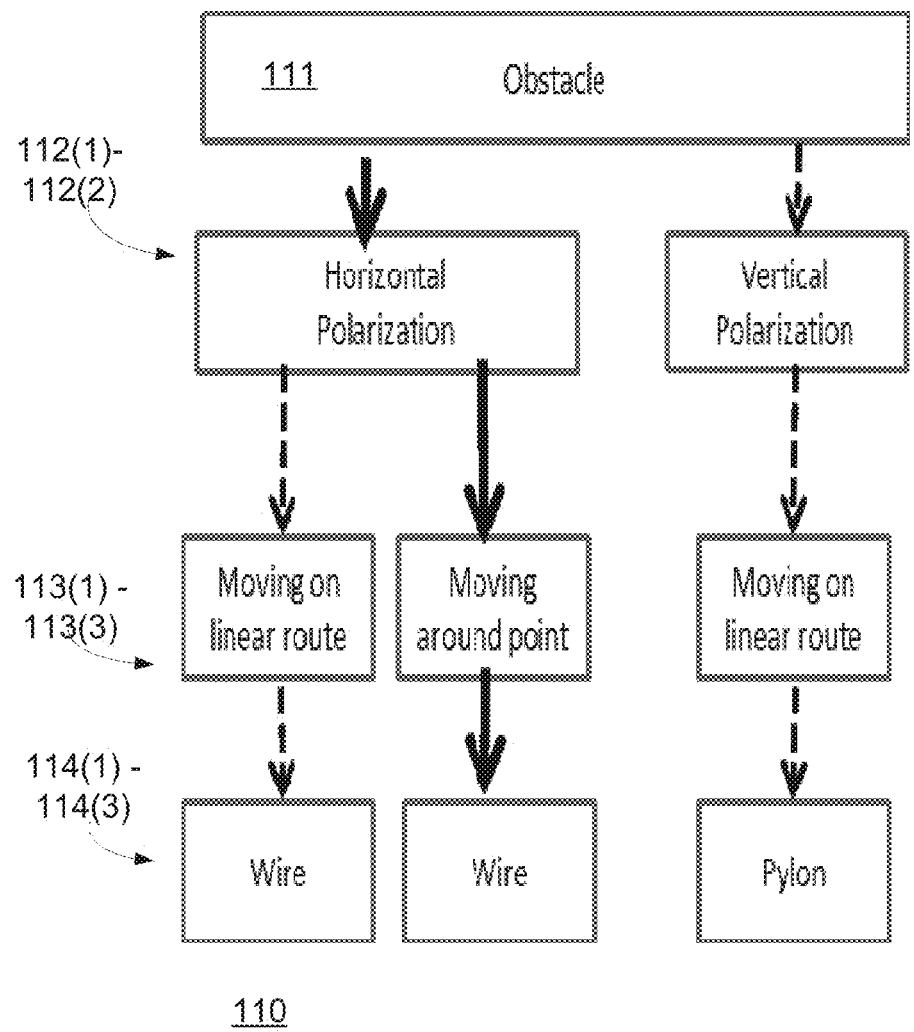
FIG. 11 illustrates a plan library according to an embodiment of the invention.

FIG. 11 describes the plan library of a system and an intention (denoted by the bold arrows) inferred by the system for the scenario described in figure Error! Reference source not found. 10. The first behavior tested by the sensor is the polarization which is identified as horizontal, the second behavior is the direction of the obstacle which is resides around a static point. In other words, the behavior of the obstacle, as is reflected in the vectors received from the radar signal processor, leads to an identification of the obstacle as wire, and leads to an accurate position and orientation of the obstacle.

In a fifth example the system propagates at a certain angle (between zero and ninety degrees) in relation to single wire. The single wire can be detected by finding (in a noiseless-ideal scenario) a decreasing rho while $\theta=\theta_0$, $\varphi=0$.

Figure 12:
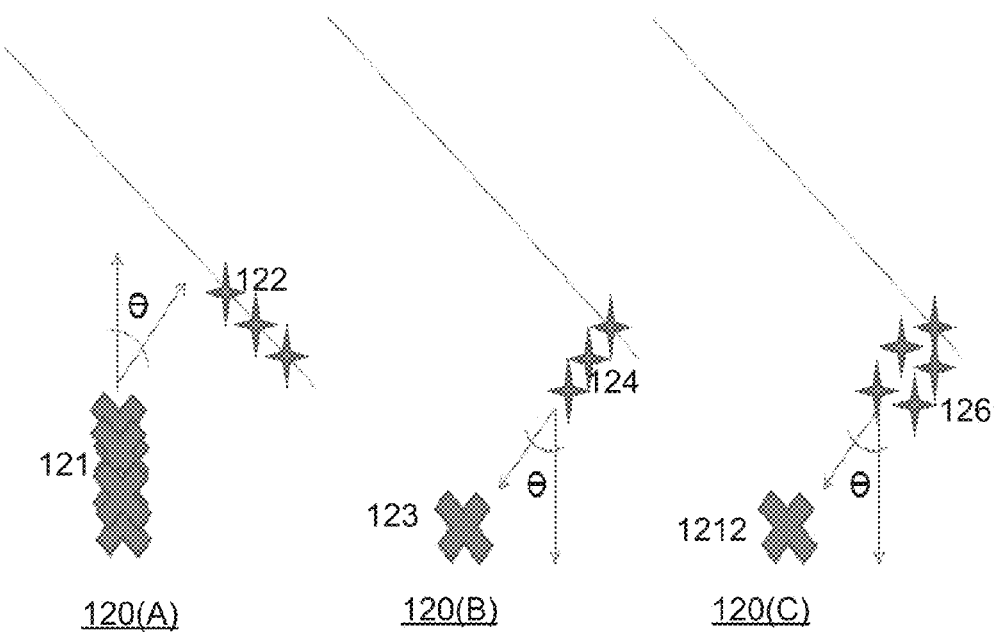
FIG. 12 illustrates a plan library according to an embodiment of the invention.

FIG. 12 includes three parts 120(A), 120(B) and 120(C). Part 120(A) illustrates a system (represented by a sequence of 'X' 121 representing the locations of the system at different points in time) approaching a wire (a point of impingement of the RF signals on the wire is denoted '+' 122). In this case, the vectors from the radar signal processor describing the wires introduce a decreasing rho and $\theta=\theta_0$, $\varphi=0$ constantly. Part 120(B) illustrates a system point of view (no noise, ideal scenario), in which the system is virtually static (X 123) while the obstacle is virtually moving (represented by a sequence of '+' 122) in which rho decreases, $\theta=\theta_0$ and, $\varphi=0$. Part 120(C) illustrates a noisy scenario in which rho slightly changes, while $\theta_0-\alpha \le \theta \le \theta_0+\alpha$ for some constant $\alpha$.

Figure 13:
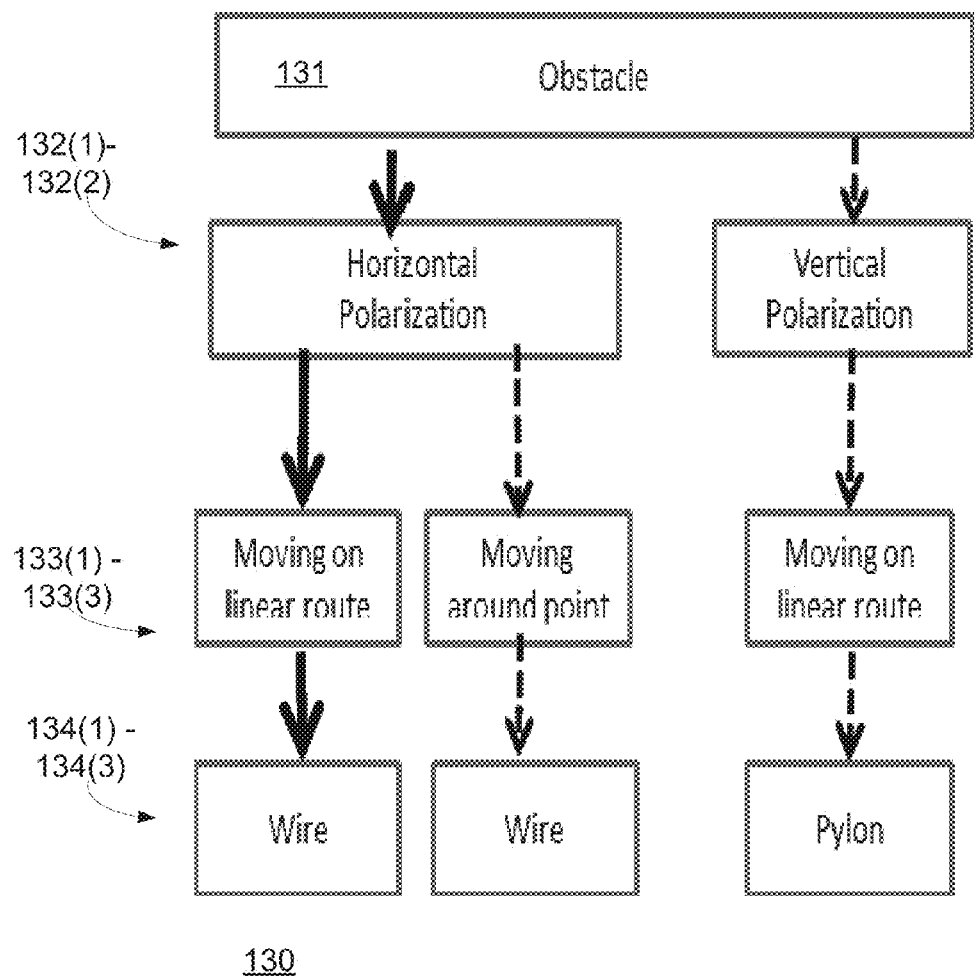
FIG. 13 illustrates a plan library according to an embodiment of the invention.

FIG. 13 describes the plan library of a system and an intention (denoted by the bold arrows) inferred by the system for the scenario described in FIG. 12. The first behavior tested by the sensor is the polarization which is identified as horizontal, the second behavior is the direction of the obstacle which is on a linear route. The behavior of the obstacle, as is reflected in the vectors received from the radar signal processor, leads, therefore, to an identification of the obstacle as wire, and leads to an accurate position and orientation of the obstacle.

System of Obstacles

In an embodiment of the invention, system of obstacles, e.g., an electricity system comprises pylons and wires, antenna farm, road lightings, are referred as a group of agents with a noticeable teamwork. The obstacles can be positioned at certain (expected) spatial relationships (for example—expected range of distances between adjacent pylons).

Figure 14:
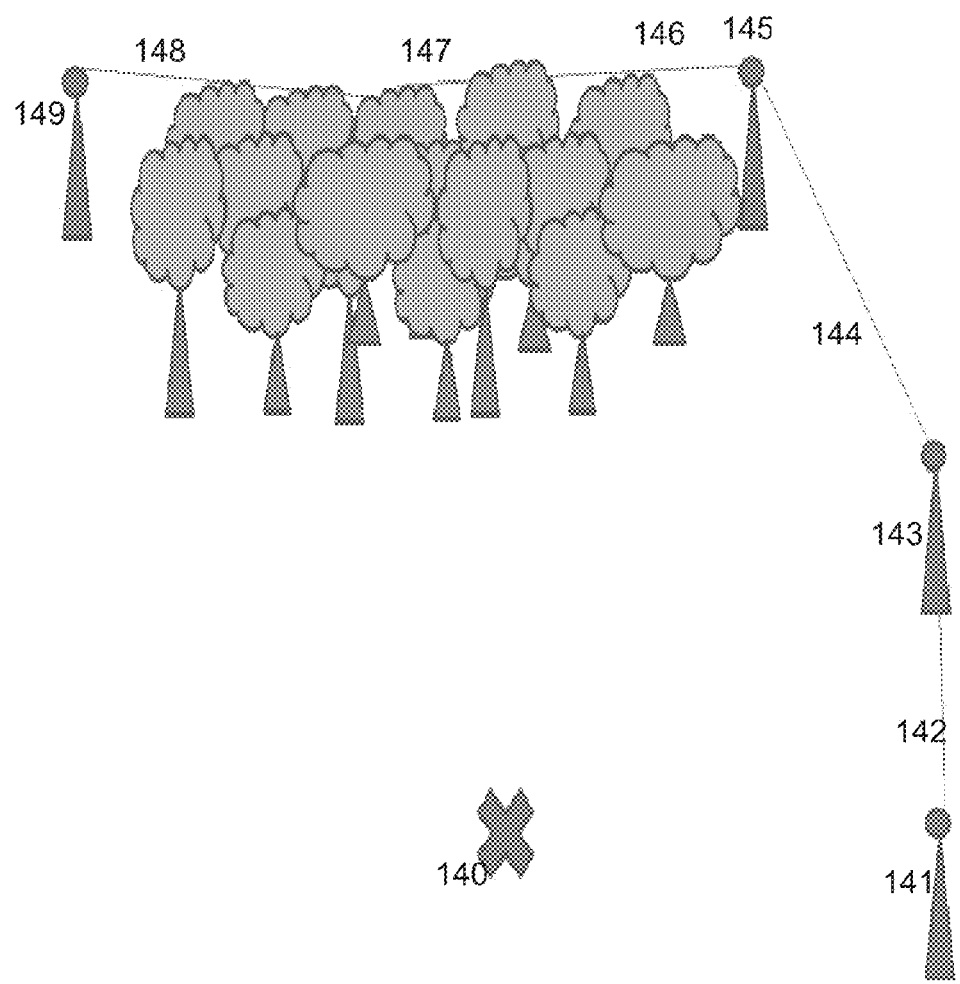
FIG. 14 illustrates a system that approaches an electricity system according to an embodiment of the invention.

In FIG. 14 Error! Reference source not found., the system (denoted 'X' 140) is approaching an electricity system, partially hidden by trees. The electricity system includes pylons 141, 143, 145, 147 and 149 and wires 142, 144, 146 and 148 stretched between these pylons. In FIG. 14 pylons 147 and at least parts of wires 146 and 148 are hidden by trees.

Figure 15:
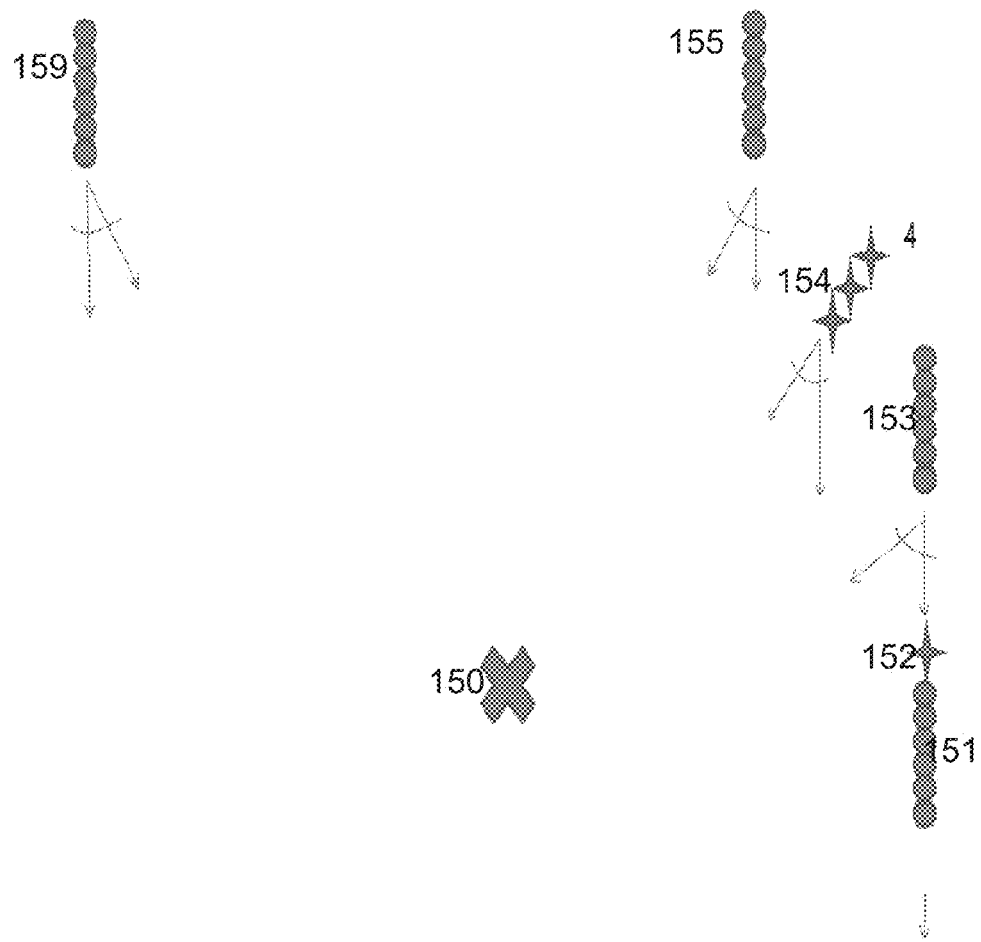
FIG. 15 illustrates signals from various objects according to an embodiment of the invention.
Figure 16:
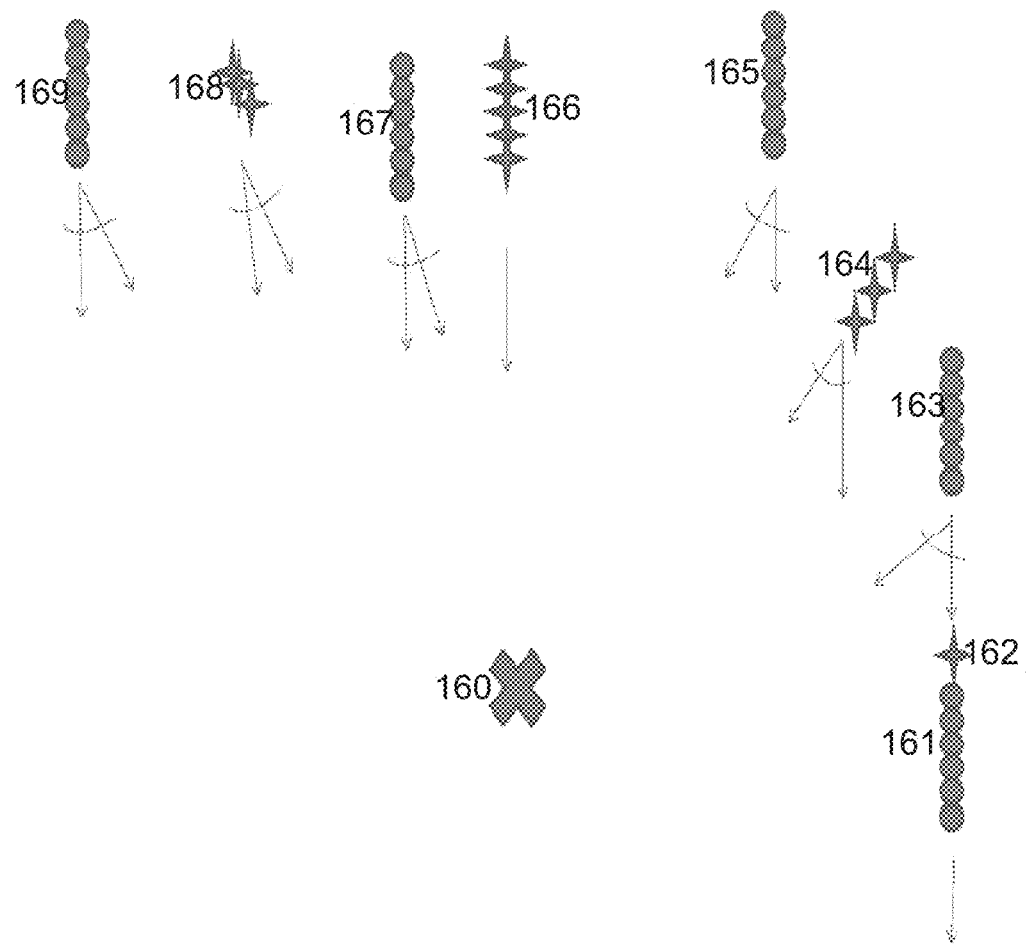
FIG. 16 illustrates a system and various objects according to an embodiment of the invention.

In FIG. 15 input RF signals are received only from pylons 141, 143, 145 and 149 (represented by sequences of "O" 151, 153, 155 and 159 respectively) and from wires 142 and 144 (represented by sequences of "+" 152 and 154 respectively).

In FIG. 14 Error! Reference source not found., the system identifies an intention of the agents (obstacles) 141, 142, 143, 144, 145 and 149. The teamwork identification enables covering for the obstacle 146, 146 and 147 (Error! Reference source not found.).

Figure 17:
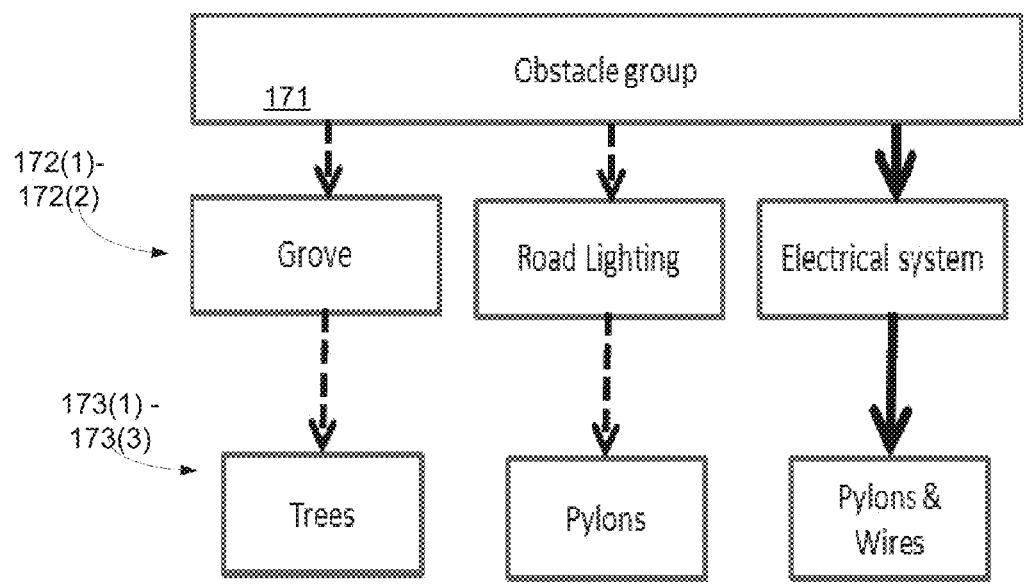
FIG. 17 illustrates a plan library according to an embodiment of the invention and FIG. 18 illustrates a method according to an embodiment of the invention.

Error! Reference source not found. FIG. 17 describes the recipe produced by the system for the scenario described in figure Error! Reference source not found.-16. The behavior of the obstacles, as is reflected in the vectors received from the radar signal processor, leads to an identification of the obstacle as electricity system, overcomes the missing data, and leads to an accurate position and orientation of all the obstacles.

Figure 18:
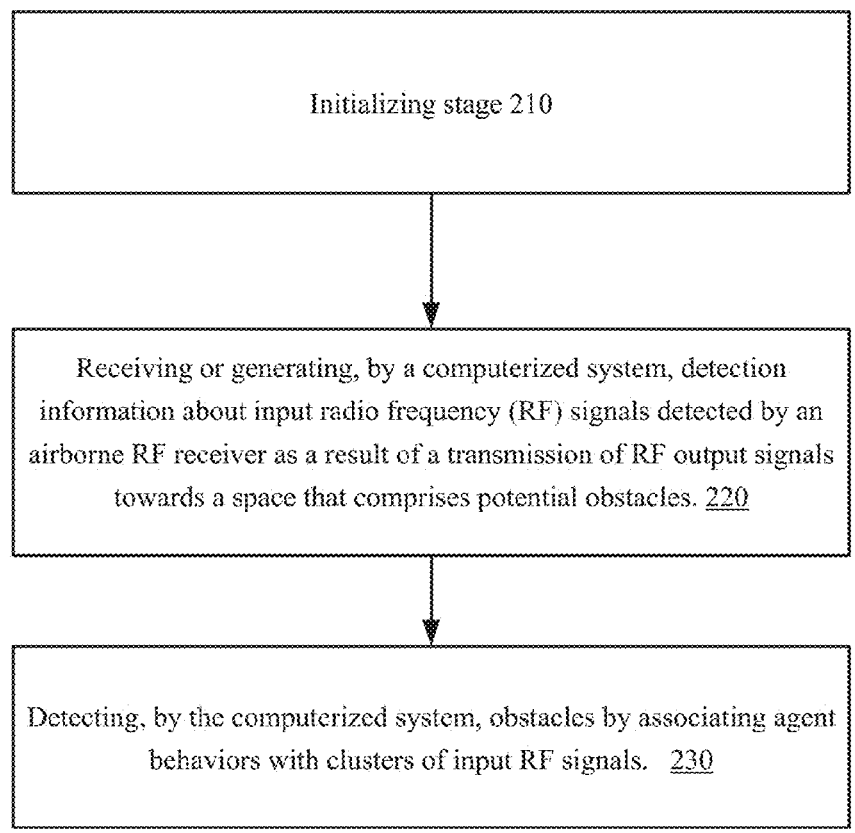

FIG. 18 illustrates method 200 according to an embodiment of the invention.

Method 200 may start by initializing stage 210.

Initializing stage 210 may include, for example, receiving a plan library of possible agent behaviors, receiving expected spatial relationships between obstacles (such as expected range between adjacent pylons). The latter allows referring to multiple obstacles as a group of agents.

Stage 210 may be followed by stage 220 of receiving or generating, by a computerized system, detection information about input radio frequency (RF) signals detected by an airborne RF receiver as a result of a transmission of RF output signals towards a space that comprises potential obstacles.

Stage 220 may include a least one (or none) of the following:
  a. Transmitting the RF output signals towards the space that comprises potential obstacles.
  b. Detecting the input RF signals.

c. Processing the input RF signals to provide the detection information.

Stage 220 may involve performing the methods illustrated in PCT patent application WO2013164811 titled "Obstacles detection system" which is incorporated herein by reference.

The detection information about the input RF signals may be provided by the airborne RF receiver, or be provided by a signal processor that processed the detection signals of the airborne RF receiver. The detection information about the input signals may include, for example, attributes about at least one of the distance, grazing angle, bearing angle, polarization and closure speed of potential obstacles.

The potential clusters may be referred to as virtually moving while the airborne RF receives can be referred to as virtually static although this referring can be performed in stage 220 or another stage of method 200. The virtual movement of the potential obstacle can be performed by associating the closure speed to the potential obstacle and not to the airborne RF receiver.

A cluster of RF signals may include RF signals detected during different points in time that arrive from substantially the same direction.

Stage 220 may be followed by stage 230 of detecting, by the computerized system, obstacles by associating agent behaviors with clusters of input RF signals.

The obstacles may include wires and pylons. Transmitted RF signals of different frequencies (or of the same frequency) may be used to detect pylons and detect wires.

The associating may include detecting an obstacle if the cluster of RF signals exhibits a behavior of an agent out of a plan library.

Stage 230 may include clustering the input RF signals to provide the clusters of input signals. A cluster of input RF signals comprises input RF signals reflected or scattered during a period of time from a potential obstacle. The RF signals of the cluster are received from substantially the same direction.

The input RF signals are detected while the airborne RF receiver moves in relation to potential obstacles and stage 220 (or any other stage of method 200) may include referring to the airborne RF receive as virtually static and referring to potential obstacles as virtually moving in relation to the airborne RF receiver.

Stage 230 may include at least one of the following:
a. Detecting a plurality of obstacles by associating a multiple agent behavior to the plurality of obstacles.
b. Associating of the multiple agent behavior to the plurality of obstacles by compensating for a lack of input RF signals from at least one of the plurality of obstacles during at least one point of time.
c. Classifying obstacles.
d. Resolving obstacle goals.
e. Associating a current position of an obstacle as a state.
f. Representing the computerized system by an executer agent and responding to the detecting of the obstacles by following a plan library of the executer agent.

The agent behavior associated (during stage 230) with a cluster of RF signals is selected out of multiple agent behaviors of a plan library.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner.

Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for obstacle detection, the method comprises:
transmitting, by a transmitter of a radar, radio frequency (RF) output signals towards a space that comprises potential obstacles; wherein the radar moves in relation to the potential obstacles during the transmitting of the RF output signals;
receiving, by a receiver of the radar, input RF signals reflected or scattered from the potential obstacles as a result of the transmitting of the RF output signals;
generating, by a radar signal processor of the radar detection information about the input RF signals; and
detecting, by the radar or by a computerized system that receives the detection information from the radar obstacles by associating agent behaviors with clusters of input RF signals.

2. The method according to claim 1 comprising:
clustering the input RF signals to provide the clusters of input signals;
wherein a cluster of input RF signals comprises input RF signals reflected or scattered during a period of time from a potential obstacle.

3. The method according to claim 1
wherein the method comprises referring, when associating agent behaviors to the clusters of input RF signals to the radar as virtually static and referring to potential obstacles as virtually moving in relation to the radar.

4. The method according to claim 1 comprising detecting a plurality of obstacles by associating a multiple agent behavior to the plurality of obstacles.

5. The method according to claim 4 wherein the associating of the multiple agent behavior to the plurality of obstacles comprises compensating for a lack of input RF signals from at least one of the plurality of obstacles during at least one point of time.

6. The method according to claim 1 wherein an agent behavior associated with a cluster of RF signals is selected out of multiple agent behaviors of a plan library; wherein the plan library is a directed acyclic connected graph data-structure, in which the nodes are agent's behaviors and edges that are are either vertical edges indicating inclusion or horizontal edges indicating temporal order.

7. The method according to claim 1 wherein the detection information comprises attributes that comprise at least one out of distance, grazing angle, bearing angle, polarization and closure speed.

8. The method according to claim 1 comprising classifying obstacles.

9. The method according to claim 1 comprising resolving obstacle goals.

10. The method according to claim 1 wherein the detecting of obstacles comprise detecting wires and pylons.

11. The method according to claim 1 comprising associating current values of attributes of the detection information that are related to an obstacle as a state of the obstacle.

12. The method according to claim 1 wherein the radar is represented by an executer agent and wherein the method comprises responding to the detecting of the obstacles by following a plan library of the executer agent; wherein the plan library is a directed acyclic connected graph data-structure, in which the nodes are agent's behaviors and edges that are either vertical edges indicating inclusion or horizontal edges indicating temporal order.

13. A radar that is airborne, the radar comprises:
 a transmitter that is arranged to transmit radio frequency (RF) output signals towards a space that comprises potential obstacles while the radar moves in relation to the potential obstacles;
 a receiver that is arranged to receive input RF signals reflected or scattered from the potential obstacles as a result of the transmitting of the RF output signals;
 a signal processor that is arranged to generate detection information about input radio frequency (RF) signals detected by an airborne RF receiver as a result of a transmission of RF output signals towards a space that comprises potential obstacles; and to detect obstacles by associating agent behaviors with clusters of input RF signals.

14. A non-transitory computer readable medium that stores instructions that once executed by a radar cause the radar to: transmit radio frequency (RF) output signals towards a space that comprises potential obstacles; wherein the radar moves in relation to the potential obstacles during the transmitting of the RF output signals; receive input RF signals reflected from the potential obstacles as a result of the transmitting of the RF output signals; generate detection information about the input RF signals and detect obstacles by associating agent behaviors with clusters of input RF signals.

15. The non-transitory computer readable medium according to claim 14 that stores instructions for clustering the input RF signals to provide the clusters of input signals; and wherein a cluster of input RF signals comprises input RF signals reflected or scattered during a period of time from a potential obstacle.

16. The non-transitory computer readable medium according to claim 14 that stores instructions for referring to the radar as virtually static and referring to potential obstacles as virtually moving in relation to the radar.

17. The non-transitory computer readable medium according to claim 14 that stores instructions for detecting a plurality of obstacles by associating a multiple agent behavior to the plurality of obstacles.

18. The non-transitory computer readable medium according to claim 17 wherein the associating of the multiple agent behavior to the plurality of obstacles comprises compensating for a lack of input RF signals from at least one of the plurality of obstacles during at least one point of time.

19. The non-transitory computer readable medium according to claim 14 wherein an agent behavior associated with a cluster of RF signals is selected out of multiple agent behaviors of a plan library.

20. The non-transitory computer readable medium according to claim 14 wherein the detection information comprises attributes that comprise at least one out of distance, grazing angle, bearing angle, polarization and closure speed.

21. The non-transitory computer readable medium according to claim 14 that stores instructions for classifying obstacles.

22. The non-transitory computer readable medium according to claim 14 that stores instructions for resolving obstacle goals.

23. The non-transitory computer readable medium according to claim 14 wherein the detecting of obstacles comprise detecting wires and pylons.

24. The non-transitory computer readable medium according to claim 14 that stores instructions for associating current values of attributes of the detection information that are related to an obstacle as a state of the obstacle.

25. The non-transitory computer readable medium according to claim 14 wherein the radar is represented by an executer agent and wherein the non-transitory computer readable medium stores instructions for responding to the detecting of the obstacles by following a plan library of the executer agent.

* * * * *